United States Patent
Taljaard

(10) Patent No.: US 9,279,592 B2
(45) Date of Patent: Mar. 8, 2016

(54) EVAPORATIVE COOLER

(76) Inventor: Jozua Taljaard, Pretoria (ZA)

( * ) Notice: Subject to any disclaimer, the term of this patent is extended or adjusted under 35 U.S.C. 154(b) by 542 days.

(21) Appl. No.: 13/537,855

(22) Filed: Jun. 29, 2012

(65) Prior Publication Data

US 2013/0008195 A1   Jan. 10, 2013

(30) Foreign Application Priority Data

Jun. 29, 2011   (ZA) .................................. 2011/04813

(51) Int. Cl.

| | |
|---|---|
| F28D 5/00 | (2006.01) |
| F25D 17/06 | (2006.01) |
| F28D 3/00 | (2006.01) |
| B01D 47/00 | (2006.01) |
| F24F 5/00 | (2006.01) |
| F28D 5/02 | (2006.01) |
| F28D 3/02 | (2006.01) |
| F24F 3/16 | (2006.01) |
| F24F 6/04 | (2006.01) |
| F28C 3/08 | (2006.01) |

(52) U.S. Cl.
CPC ................ *F24F 5/0035* (2013.01); *F28D 5/02* (2013.01); *F24F 2003/1617* (2013.01); *F24F 2006/046* (2013.01); *F28C 3/08* (2013.01); *F28D 3/02* (2013.01); *F28F 2250/08* (2013.01); *Y02B 30/545* (2013.01)

(58) Field of Classification Search
CPC ............ F24F 5/0035; F24F 2003/1617; F24F 2006/046; F28D 5/02; F28D 3/02; F28C 3/08; Y02B 30/545; F28F 2250/08
USPC ................. 62/314, 91, 304; 261/29; 454/256
See application file for complete search history.

(56) References Cited

U.S. PATENT DOCUMENTS

| | | | | |
|---|---|---|---|---|
| 2,752,134 | A * | 6/1956 | Paulus ............................ | 261/29 |
| 3,552,097 | A * | 1/1971 | Grasseler ........................ | 96/282 |
| 4,026,971 | A * | 5/1977 | Glasoe ............................ | 261/29 |
| 4,749,389 | A * | 6/1988 | Worwag .......................... | 96/365 |
| 5,192,464 | A * | 3/1993 | Pawlowski et al. ............. | 261/27 |
| 5,529,536 | A | 6/1996 | Sizemore et al. | |
| 6,131,889 | A | 10/2000 | Birdsell et al. | |
| 7,143,597 | B2 * | 12/2006 | Hyland et al. .................. | 62/236 |
| 2009/0264063 | A1 * | 10/2009 | Tinsley et al. ................ | 454/324 |

* cited by examiner

*Primary Examiner* — Allen Flanigan
*Assistant Examiner* — Filip Zec
(74) *Attorney, Agent, or Firm* — Nixon & Vanderhye PC

(57) ABSTRACT

An evaporative cooler 10 comprises a housing 12 defining an inlet 14 for air. An air cooling arrangement 16 located in the housing between the inlet and an inlet to a duct 18 extending to an air outlet 20. A bath 24 for water is located towards a bottom region of the housing. Ducting 22 extends from the bath to a liquid outlet 26 in a top region of the housing, for releasing liquid onto the air cooling arrangement. The bath is configured to capture the released liquid. A fan 30 cooperates with the duct 18 to draw air through the air inlet, the air cooling arrangement and into the duct towards the outlet. The same electrical motor 32 is used to drive both the fan and the rotor or impeller of a water pump 34 for moving the liquid from the bath to the liquid outlet.

13 Claims, 6 Drawing Sheets

US 9,279,592 B2

EVAPORATIVE COOLER

INTRODUCTION AND BACKGROUND

This invention relates to an evaporative cooler. It also relates to an air and liquid moving assembly and a method of cooling air.

A known evaporative cooler comprises a housing defining an inlet for air, a filter and air cooling arrangement located in the housing between the air inlet and an inlet to a duct extending to an air outlet. A fan or blower is mounted in the housing to move air from the air inlet, through the filter and air cooling arrangement and into the duct. The fan is driven by a first electrical motor. The evaporative cooler further comprises a bath for water towards a bottom region of the housing. A submerged pump comprising a second electrical motor is provided in the bath to circulate water from the bath to a top region of the housing, where the water is released onto the filter and air cooling arrangement and allowed to move under the influence of gravity back into the bath. A problem with the known evaporative cooler is that at least a drive shaft of the second motor is exposed to debris in the water, so that the pump often fails. Maintenance is difficult, time consuming and disruptive.

Object of The Invention

Accordingly, it is an object of the present invention to provide an alternative evaporative cooler, air and liquid moving assembly and method of cooling air with which the applicant believes the aforementioned disadvantages may at least be alleviated or which may provide a useful alternative for the known evaporative coolers.

SUMMARY OF THE INVENTION

According to the invention there is provided an evaporative cooler comprising:
- a housing defining an inlet for air;
- an air cooling arrangement located in the housing between the inlet and an inlet to a duct extending to an air outlet;
- a bath for a liquid located towards a bottom region of the housing;
- ducting extending from the bath to a liquid outlet in a top region of the housing, for releasing liquid onto the air cooling arrangement;
- the bath being configured to capture the released liquid;
- an air moving member cooperating with the duct to draw air through the air inlet, the air cooling arrangement and into the duct towards the outlet;
- an electrical motor for driving the air moving member; and
- a liquid moving member for moving the liquid from the bath to the liquid outlet and which liquid moving member is also driven by said electrical motor.

The air moving member may comprise a fan.

The liquid may be water and the water moving member may comprise a pump. The pump may be any suitable pump, for example a rotary pump comprising a moving element in the form of a rotor or impeller. The fan and the rotor may be mounted on a drive shaft of the electrical motor. The fan and rotor may be mounted coaxially on the shaft.

Means for providing a rotary speed differential between the fan and the rotor may be provided. The differential may be adjustable.

The invention also includes within its scope an air and liquid moving assembly comprising:
- an electrical motor having a drive shaft;
- an air moving member connected to be driven by the motor via the shaft; and
- a liquid moving element of the liquid moving member connected to be driven by the motor via the shaft.

The air moving member may be provided towards one end of the shaft and the liquid moving element may be provided towards an opposite end of the shaft.

Means for providing a rotary speed differential between the air moving member and the liquid moving element may be provided. The differential may be adjustable.

The shaft may comprise a first part and a second part. The first part may extend in one direction away from a body of the motor and may carry the air moving member, and the second part may extend in an opposite direction away from the body of the motor and may carry the moving element of the liquid moving member.

Means for providing a rotary speed differential between the first part and the second part of the shaft may be provided. The differential may be adjustable.

Further included within the scope of the present invention is an air flow regulating assembly as herein defined and/or described.

Yet further included within the scope of the present invention is a method of cooling air, the method comprising the steps of:
- causing air to move along a first path from an air inlet to an air outlet;
- circulating a liquid to move from a reservoir to a liquid outlet, through the first path and back to the reservoir; and
- utilizing one electrical motor for moving the air and circulating the liquid.

The liquid may be any suitable liquid, such as water.

BRIEF DESCRIPTION OF THE ACCOMPANYING DIAGRAMS

The invention will now further be described, by way of example only, with reference to the accompanying diagrams wherein.

DESCRIPTION OF A PREFERRED EMBODIMENT OF THE INVENTION

Figure 1:
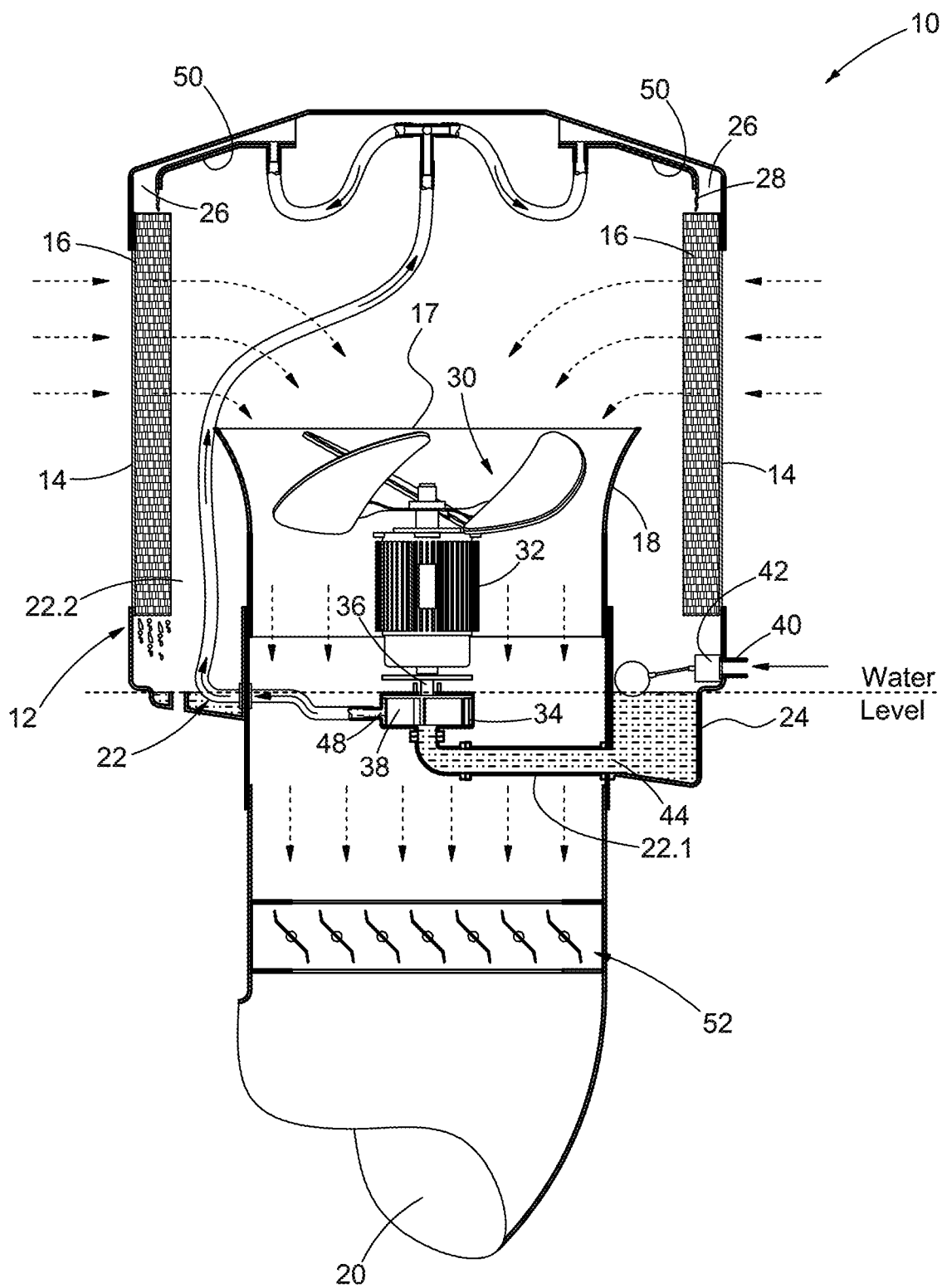
FIG. 1 is a diagrammatic sectional view through an example embodiment of an evaporative cooler.
Figure 2:
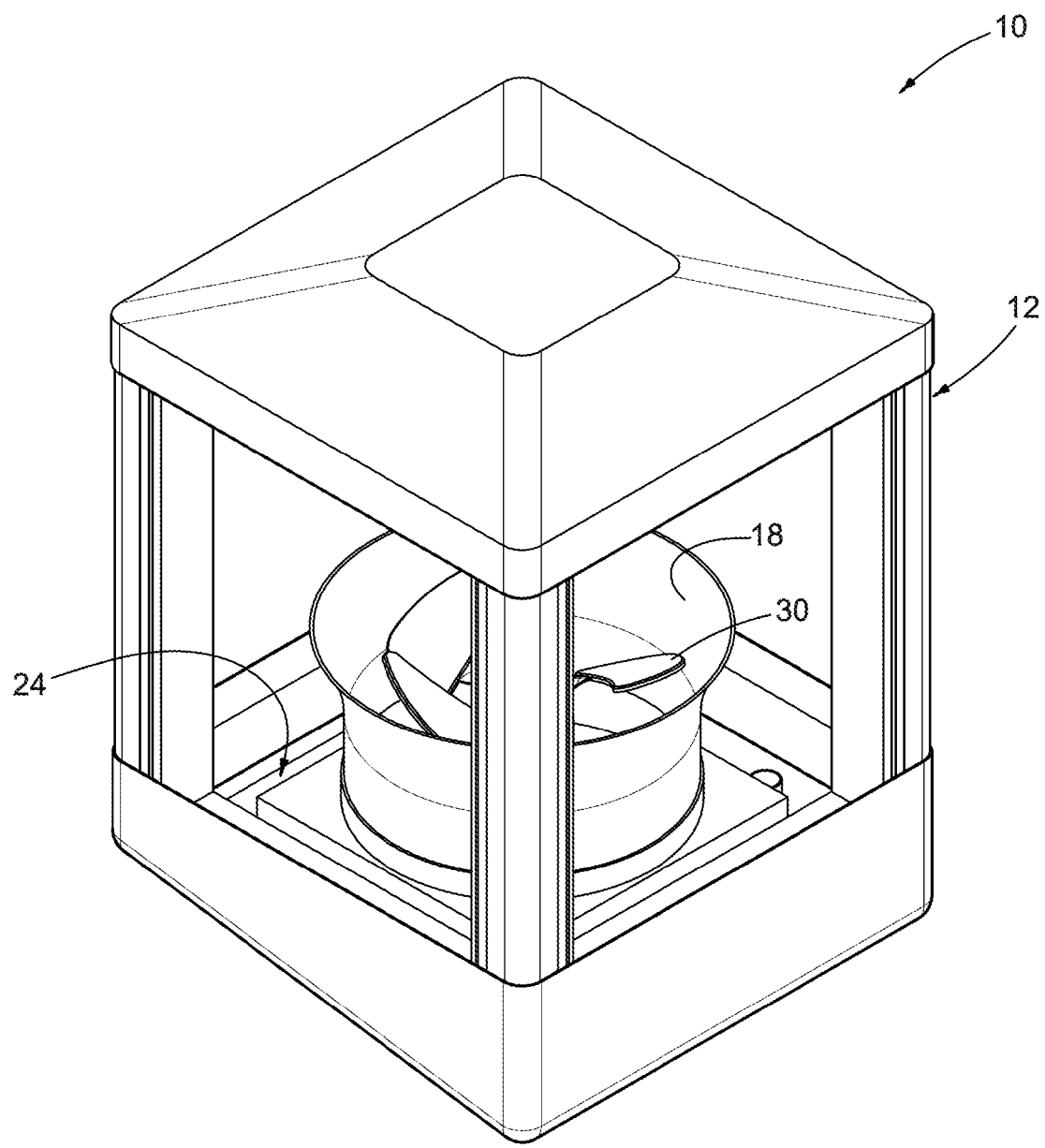
FIG. 2 is a diagrammatic perspective view of part of an inside of the evaporative cooler, but without a filter and air cooling arrangement, which are omitted for the sake of clarity.
Figure 3:
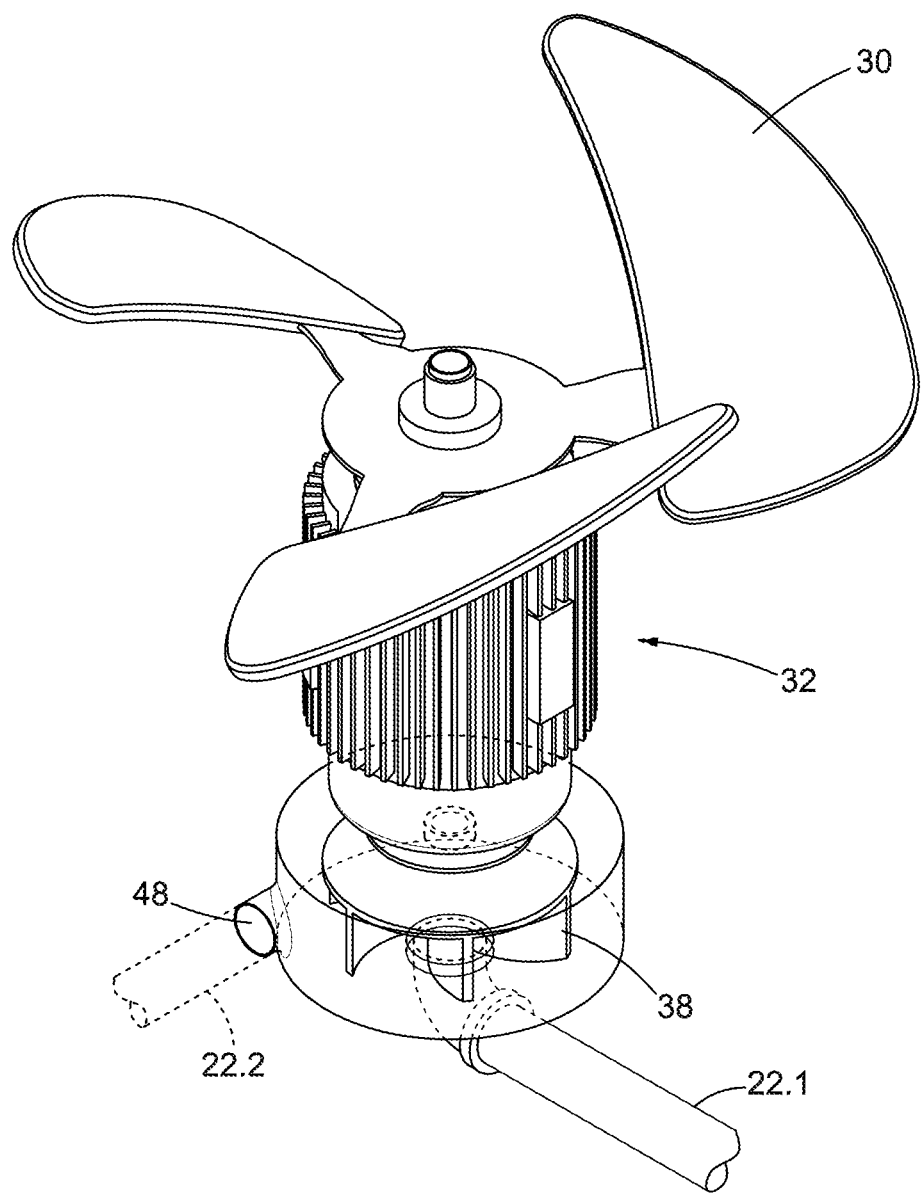
FIG. 3 is a diagrammatic perspective view of one example embodiment of an air and liquid moving assembly forming part of the evaporative cooler.
Figure 4:
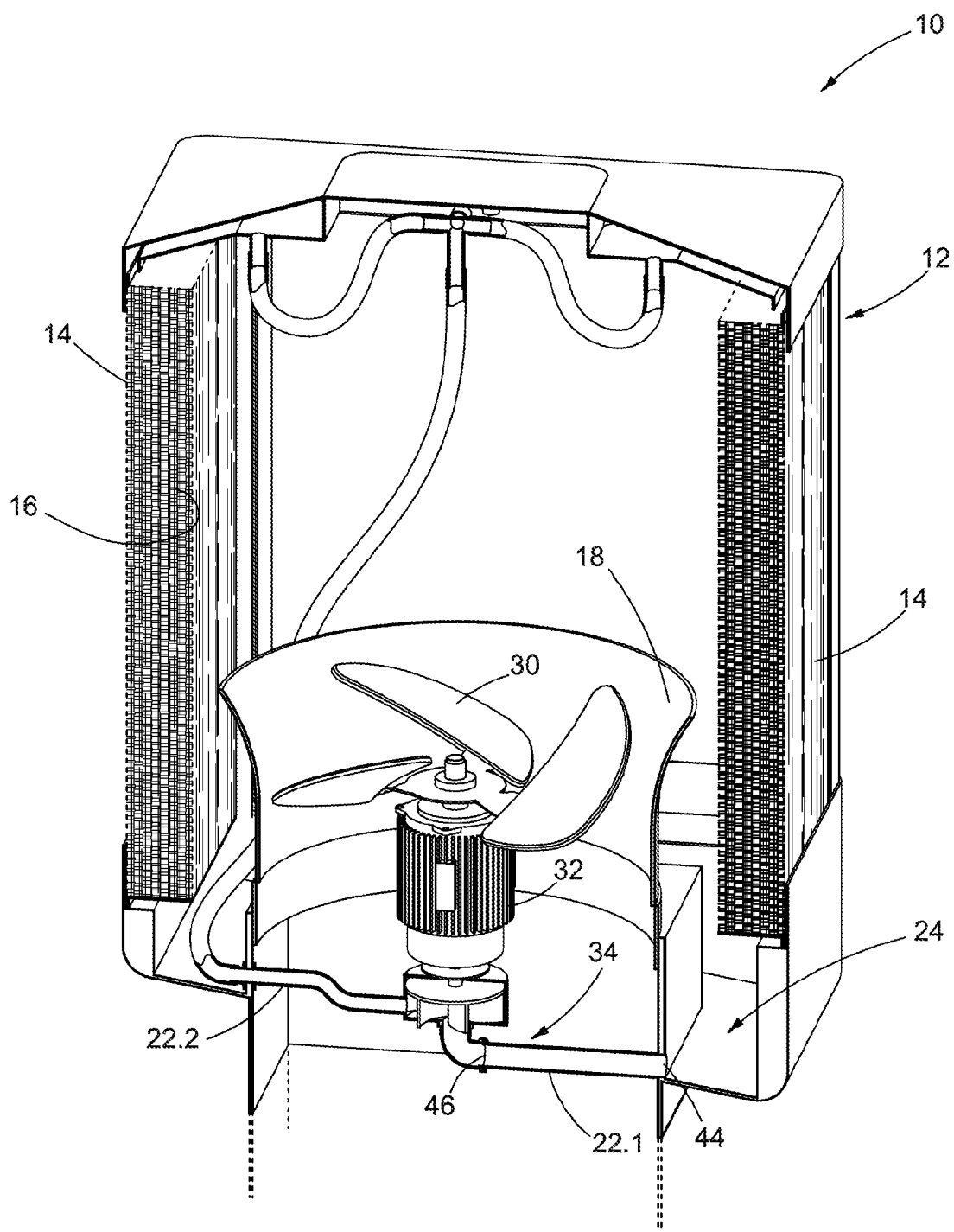
FIG. 4 is a diagrammatic broken away perspective view of the evaporative cooler of FIG. 1.

An example embodiment of an evaporative cooler is generally designated by the reference numeral 10 in FIG. 1.

The evaporative cooler 10 comprises a housing 12 defining an inlet 14 for air in a circumferential inlet region thereof. A filter and cooling arrangement 16 is located in the housing between the air inlet 14 and an inlet 17 to a duct 18 extending to an outlet 20 for air. Ducting 22 extends from a water reservoir or bath 24 located towards a bottom region of the housing to at least one water outlet 26 in a top region of the housing, for releasing water 28 onto the filter and cooling arrangement 16. The water bath 24 is configured to recapture the released water, which moves from the top of the housing towards the bottom thereof under the influence of gravity. A fan 30 cooperates with the duct 18 to draw air through the air inlet 14 and the filter and cooling arrangement 16 into the duct 18 and towards the outlet 20. The fan 30 is driven by an electrical motor 32 and said electrical motor 32 also drives a moving element or rotor 38 of a water pump 34 for pumping water from the bath 24 through the ducting 22 to the outlet 26.

In the example embodiment of FIG. 1, the electrical motor 32 is mounted in the duct 18. A drive shaft 36 of the motor 32 is mounted concentrically in the duct. Towards one end thereof, preferably a top end, the shaft is drivingly connected to the fan 30 and towards an opposite end thereof it is drivingly connected to a rotor 38 of the pump 34.

The housing 12 is rectangular or square in transverse cross section, to have four substantially open sides. The peripheral air inlet region 14 is defined by each of the open sides. The filter and air cooling arrangement 16 is also rectangular or square in transverse cross section and is provided inside the housing and immediately adjacent the sides.

The water bath 24 is located in a bottom region of the housing 12. The bath is annular in transverse cross section and extends from the four sides of the housing to the duct 18 and around the duct. The bath has an inlet 40 for water which is opened and closed in well known manner under control of a float valve 42. The bath 24 has an outlet 44 towards a bottom region thereof and a first part 22.1 of the ducting 22 connects the outlet 44 to an inlet 46 of the pump 34. An outlet 48 of the pump is connected by a second part 22.2 of the ducting 22 to a water releasing canopy 50 of the housing. The canopy 50 comprises an annular and peripheral outlet 26 for releasing water 28 pumped from the bath onto the filter and cooling arrangement 16. The released water 28 moves downwardly through the filter and cooling arrangement under the influence of gravity and is recaptured in the annular bath 24, from where it is pumped by the re-circulating pump 34.

It will be appreciated that, during use, the motor 32, which is not a submerged motor, continuously drives the fan 30 to draw air through the air inlet region 14, through the filter and cooling arrangement 16 and into the duct towards the outlet. The same motor 32 drives the pump 34, continuously to circulate water from the bath 24 to the water release canopy 50.

Figure 7:
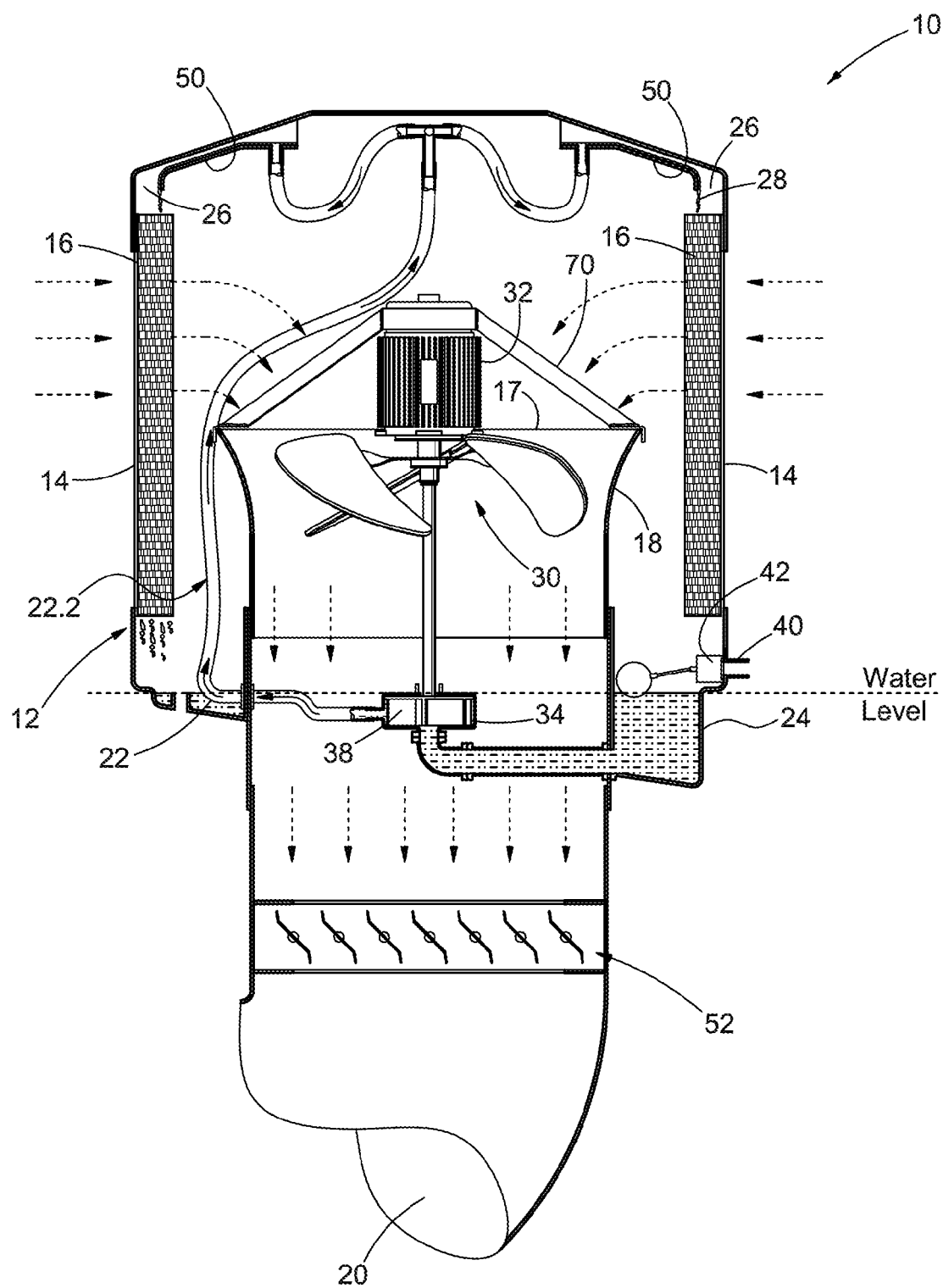
FIG. 7 is a view similar to FIG. 1 of another example embodiment of the evaporative cooler.

In FIG. 7 there is shown another example embodiment of the evaporative cooler. The duct 18, towards the inlet thereof, is bell shaped and the electrical motor 32 is suspended from a frame 70 mounted on the duct. The motor 32 is located outside the duct and the drive shaft 36 extends coaxially into the duct. Both the fan 30 and the rotor 38 are mounted on the shaft. Means for providing a rotary speed differential between the fan and the rotor may be provided.

As shown in FIG. 1, an air flow control mechanism or regulator 52 is provided between the inlet 17 to the duct 18 and the outlet 20. The regulator is shown in more detail in FIGS. 5 and 6. The regulator comprises a louver arrangement 54 comprising a plurality of louver members 54.1 to 54.n, each mounted between a first gear 54.11 and a second gear 54.12 of a respective gear pair. The first gears of each pair are arranged in a linear meshing first gear train adjacent the one ends of the members and the second gears of each pair are arranged in a linear meshing second gear train adjacent the other ends of the members. Drive means in the form of an electrical motor (not shown) is provided to drive at least one of the first gear train and the second gear train. The drive means is controlled by a control unit 56. A remote control unit 58 may be provided and is in control signal communication with the control unit 56.

Figure 5:
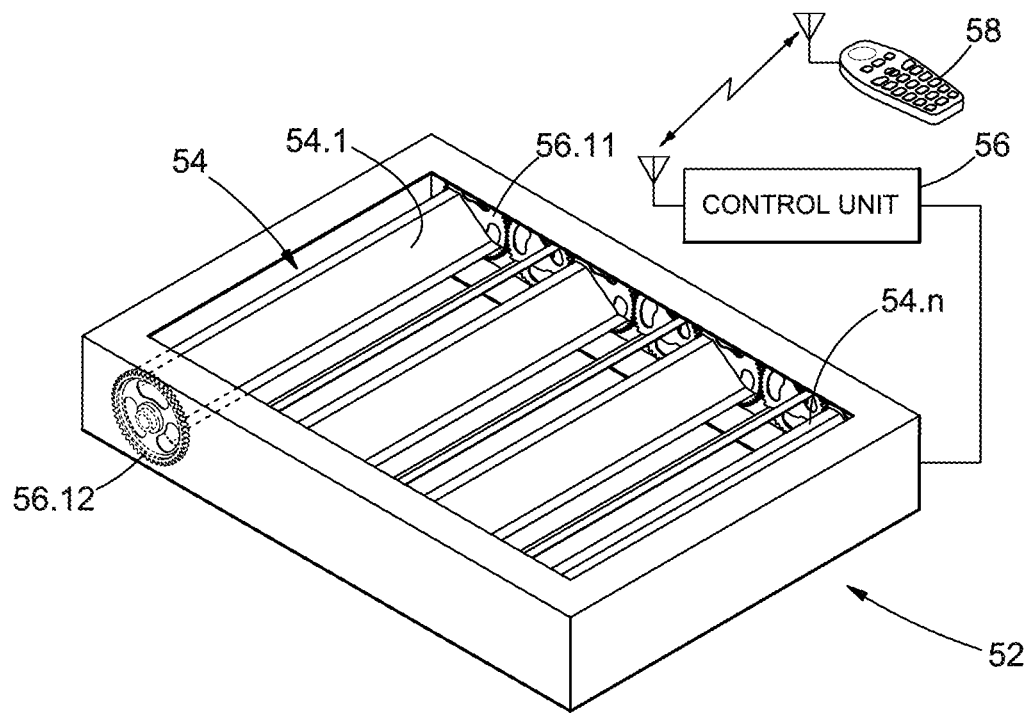
FIG. 5 is a diagrammatic perspective view of an air flow regulating assembly in a partially open configuration.
Figure 6:
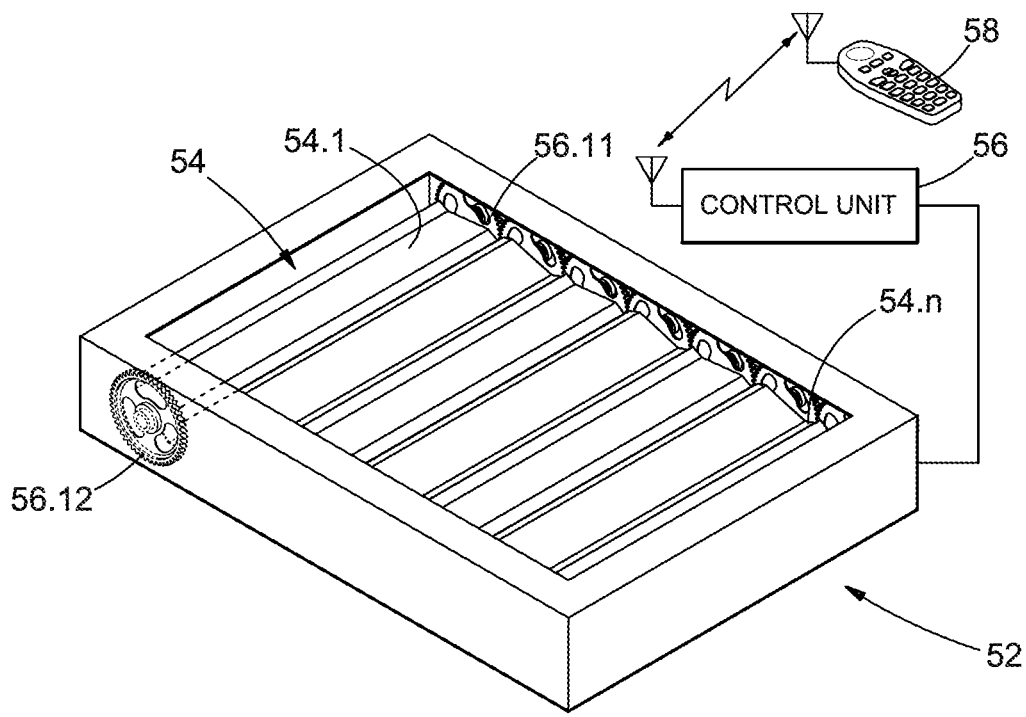
FIG. 6 is a view similar to FIG. 5 with the assembly in a closed configuration.

In use, a user may, by utilizing one of a control panel on the control unit 56 and the remote control unit 58, cause the motor to drive the louver arrangement between a closed configuration as shown in FIG. 6 and a fully open configuration (not shown). In FIG. 5, a partially open configuration is shown. The adjustment to the arrangement may be continuous, alternatively step-wise.

It will be appreciated that there are many variations in detail on each of the the evaporative cooler, the air and liquid moving assembly, the method of cooling air and the airflow control mechanism as herein defined and/or described, without departing from the scope and spirit of the appended claims.

The invention claimed is:

1. An evaporative cooler comprising:
    a housing having a top region and a bottom region and defining an air inlet located between the top region and the bottom region of the housing;
    an air duct located inside the housing, the duct having an inlet and an outlet, the inlet being located between the top region and the bottom region of the housing and the outlet being located below the bottom region of the housing;
    an air cooling arrangement located in the housing between the air inlet of the housing and the inlet of the duct;
    an air moving member located in the duct;
    a bath for a liquid located towards the bottom region of the housing;
    a liquid moving member located in the duct to move the liquid from the bath;
    ducting extending from the liquid moving member to a liquid outlet located towards the top region of the housing above the air cooling arrangement;
    an electrical motor located in the housing to drive both the liquid moving member and the air moving member, so that liquid is moved from the bath to the liquid outlet from where the liquid moves through the air cooling arrangement under the influence of gravity towards the bottom region of the housing to be captured in the bath, and so that air is also moved through the air inlet of the housing, through the air cooling arrangement, into the inlet of the duct and towards the outlet of the duct; and
    an air flow regulator including an adjustable louver arrangement to regulate air flow through the duct, the air flow regulator being located between the duct inlet and the duct outlet;
    the louver arrangement being comprised of a plurality of louver members, each louver member being mounted between a first gear and a second gear of a respective gear pair; and
    the first gear being arranged in a linear meshing first gear train adjacent to a first end of the louver member, and the second gear being arranged in a linear meshing second gear train adjacent to a second end of the louver member.

2. The evaporative cooler as claimed in claim 1 wherein the air moving member comprises a fan.

3. The evaporative cooler as claimed in claim 1 wherein the liquid moving member comprises a water pump.

4. The evaporative cooler as claimed in claim 3 wherein the water pump is a rotary pump comprising a water moving element in the form of a rotor.

5. The evaporative cooler as claimed in claim 4 wherein the fan and the rotor are mounted on a drive shaft of the electrical motor.

6. The evaporative cooler as claimed in claim 5 wherein the fan and rotor are mounted coaxially on the shaft.

7. The evaporative cooler as claimed in claim 6 comprising means for providing a rotary speed differential between the fan and the rotor.

8. The evaporative cooler as claimed in claim 1, wherein the air duct is bell shaped at the inlet thereof, wherein the air moving member is located adjacent to the inlet and wherein the air moving member and liquid moving member are driven by the electrical motor via a shaft which extends coaxially inside the duct.

9. The evaporative cooler as claimed in claim 8, wherein the bath for the liquid extends around the duct and wherein the outlet of the duct is located on another side of the bath for a liquid than the inlet of the duct.

10. The evaporative cooler as claimed in claim 9, wherein the bath for the liquid is connected to the liquid moving member inside the duct by a conduit extending transversely to the duct.

11. The evaporative cooler as claimed in claim 1, wherein the louver arrangement is further comprised of a second electrical motor to drive at least one of the first gear train and the second gear train.

12. The evaporative cooler as claimed in claim 11, wherein the louver arrangement is further comprised of a control unit to control the second motor and a remote control unit that is in control signal communication with the control unit.

13. The evaporative cooler as claimed in claim 1, wherein the electrical motor is located in the air duct located inside the housing.

* * * * *